(12) United States Patent
Dai

(10) Patent No.: US 7,155,621 B2
(45) Date of Patent: *Dec. 26, 2006

(54) METHOD AND APPARATUS TO ENHANCE PROCESSOR POWER MANAGEMENT

(75) Inventor: Xia Dai, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 561 days.

This patent is subject to a terminal disclaimer.

(21) Appl. No.: 09/994,982

(22) Filed: Nov. 26, 2001

(65) Prior Publication Data

US 2002/0083356 A1    Jun. 27, 2002

Related U.S. Application Data

(63) Continuation-in-part of application No. 09/677,263, filed on Sep. 30, 2000.

(51) Int. Cl.
G06F 1/32 (2006.01)

(52) U.S. Cl. ............... 713/322; 713/320; 713/323; 713/224

(58) Field of Classification Search ......... 713/300–340
See application file for complete search history.

(56) References Cited

U.S. PATENT DOCUMENTS

| 5,021,679 | A | | 6/1991 | Fairbanks et al. |
| 5,153,535 | A | | 10/1992 | Fairbanks et al. |
| 5,175,706 | A | * | 12/1992 | Edme ..................... 365/226 |
| 5,307,003 | A | | 4/1994 | Fairbanks et al. |
| 5,457,407 | A | | 10/1995 | Shu et al. |
| 5,627,412 | A | | 5/1997 | Beard |
| 5,752,011 | A | | 5/1998 | Thomas et al. |
| 5,760,636 | A | | 6/1998 | Noble et al. |
| 5,787,294 | A | | 7/1998 | Evoy |
| 5,974,557 | A | | 10/1999 | Thomas et al. |
| 6,035,407 | A | * | 3/2000 | Gebara et al. ............... 713/300 |
| 6,040,845 | A | | 3/2000 | Melo et al. |
| 6,085,330 | A | * | 7/2000 | Hewitt et al. ............... 713/322 |
| 6,118,306 | A | | 9/2000 | Orton et al. |
| 6,216,235 | B1 | | 4/2001 | Thomas et al. |
| 6,266,776 | B1 | | 7/2001 | Sakai |
| 6,311,281 | B1 | | 10/2001 | Pole et al. |
| 6,418,535 | B1 | | 7/2002 | Kulakowski et al. |
| 6,425,086 | B1 | * | 7/2002 | Clark et al. ................. 713/322 |
| 6,460,106 | B1 | | 10/2002 | Stufflebeam |

(Continued)

FOREIGN PATENT DOCUMENTS

JP    11-015658    1/1999

(Continued)

OTHER PUBLICATIONS

"Power Management Clock Change for 603 Processor", IBM Technical Disclosure Bulletin, Dec. 1, 1995, vol. 38, No. 12, pp. 325-328.

(Continued)

Primary Examiner—James K. Trujillo
Assistant Examiner—Paul Yanchus, III
(74) Attorney, Agent, or Firm—Blakely, Sokoloff, Taylor & Zafman LLP

(57) ABSTRACT

A method and an apparatus to dynamically transition a processor between two performance states, high performance and low power. Predetermined core clock frequency and supply voltage levels of the processor define each performance state. Transitioning the supply voltage while the processor is in the active mode and transitioning the frequency while the processor is in the sleep mode significantly reduce the processor latency.

18 Claims, 4 Drawing Sheets

U.S. PATENT DOCUMENTS

| | | |
|---|---|---|
| 6,487,668 B1 | 11/2002 | Thomas et al. |
| 6,564,329 B1 | 5/2003 | Cheung et al. |
| 6,715,089 B1 * | 3/2004 | Zdravkovic ................ 713/322 |
| 6,941,480 B1 * | 9/2005 | Dai ........................... 713/320 |

FOREIGN PATENT DOCUMENTS

| | | |
|---|---|---|
| JP | 110115658 A | 1/1999 |
| WO | PCTUS01/30254 | 1/2003 |

OTHER PUBLICATIONS

Bellaouar, A., et al., "Supply Voltage Scaling for Temperature Insensitive CMOS Circuit Operation", 1057-7130/98 Copyright 1998 IEEE Transactions on Circuits and Systems-II: Analog and Digital Signal Processing, vol. 45, No. 3, Mar. 1998, pp. 415-417.

Dancy, Abram, et al., "Techniques for Aggressive Supply Voltage Scaling and Efficient Regulation", 0-7803-3669-0 Copyright 1997 IEEE, IEEE 1997 Custom Integrated Circuits Conference, pp. 579-586.

Gonzalez, Ricardo, et al., "Supply and Threshold Voltage Scaling for Low Power CMOS", 0018-9200/97 Copyright 1997 IEEE, IEEE Journal of Solid-State Circuits, vol. 32, No. 8, Aug. 1997, pp. 1210-1216.

* cited by examiner

METHOD AND APPARATUS TO ENHANCE PROCESSOR POWER MANAGEMENT

This patent application is a continuation-in-part of patent application Ser. No. 09/677,263, filed Sep. 30, 2000.

FIELD OF THE INVENTION

The present invention relates to processors including microprocessors. Specifically, this invention relates to managing processor latency.

BACKGROUND OF THE INVENTION

Portable systems, such as portable computers, have become increasingly popular as replacements for desktop systems. A portable system relies on a battery as its power source when it is not connected to an external power source, such as an AC outlet. As battery life is limited, power consumption in the system is reduced typically by lowering the core supply voltage and the core clock frequency of the processor. Thus, the portable system operates in a high performance state when it is powered by an external source and in a low power state when powered by a battery.

In some portable systems, the transition between the two states occurs statically, for example, at reset or reboot. The Geyserville™ processor technology of the Intel Corporation, on the other hand, is capable of dynamically transitioning between the two states, i.e., without a processor reset. The Geyserville technology is an improvement over the technology that changes the performance states statically because it achieves the transitions seamlessly and relatively rapidly without user intervention.

Even the dynamic Geyserville technology, however, may take more than 500 micro seconds to adjust the core supply voltage and the core clock frequency of the processor. This latency is the result of the processor being placed in the deep sleep mode (ACPI Specification C3 mode) during the entire transition. ACPI Specification stands for the Advanced Configuration and Power Interface Specification, Revision 2.0, published on Jul. 27, 2000. Additional latency results to re-activate the system clock input to the processor to enable it to exit deep sleep following the transition.

The high processor latency associated with Geyserville is undesirable because it is wasted time that slows down the system operation.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The present invention improves the Geyserville technology by reducing the processor latency associate with Geyserville. Power dissipation of the processor is proportional to core clock frequency and to the square of core supply voltage. As the core clock frequency is reduced, the minimum required core supply voltage level is also reduced, thereby dramatically reducing the processor's power consumption. Depending on the power consumption desired of the system, the system may be set at one of the multiple performance states. For example, if the system is only powered by battery (such as, when the system is being used as a portable unit remotely without access to an external power supply), the system is placed in a low power state to conserve power. However, if the system is powered by an external power source (such as, an alternating current or AC outlet), the system is placed in a high performance state.

In this description, the system may be a portable computer, a notebook computer, a hand-held electronic device, and the like. Also, the terms core clock frequency and processor clock frequency are synonymous. Also, the terms core supply voltage and processor supply voltage are synonymous. Additionally, the ensuing description refers to two performance states, low power and high performance, between which the transitions are performed.

Figure 1:
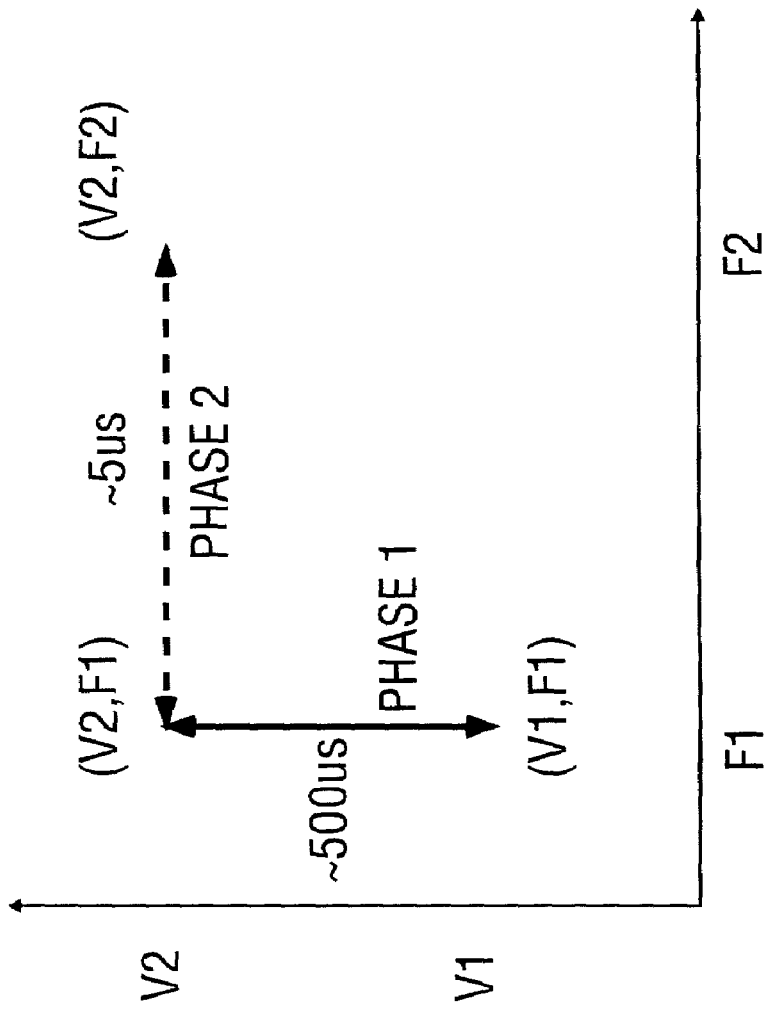
FIG. 1 is a transition graph pertaining to one embodiment.

FIG. 1 shows a transition graph to transition between the two states. In one embodiment, the transition, which may be performed by a controller formed of one or more layers (including, for example, software, firmware, and hardware), is performed in two different phases. In phase one, the core supply voltage level is adjusted. In phase two, the core clock frequency level is adjusted.

During the low power to high performance transition, phase two follows phase one. The core supply voltage level is elevated first such that it is at least the minimum voltage level required to support the elevated core clock frequency level of phase two.

During phase one, the processor remains in the active mode (for example, ACPI Specification C0 mode) because the processor can continue to perform its functions properly at the elevated core supply voltage level.

During phase 2, the processor is placed in the sleep mode. In one embodiment, the sleep mode is not any of the C0–C3 modes of the ACPI Specification. The sleep mode is not visible to the end user. During the sleep mode the core clock (for example, the phase locked loop circuit) and the system clock (which is an input to the processor) remain active but the processor typically performs no logical functions.

To the end user the processor seems to be in the deep sleep (C3) mode because it refuses to process requests from other system components. When viewed from inside the processor, however, the processor seems to be in the quick start (for example, ACPI Specification C2) mode because the core clock remains active and the system clock input to the processor remains active.

Performing phase 2 in the sleep mode instead of the deep sleep mode (C3) reduces the latency to re-activate the system clock input to the processor after completing phase 2. In one embodiment of the present invention, phase 2 is performed in less than 5 microseconds.

In one embodiment of the present invention, the entire transition from low power to high performance is performed with less than 5 microseconds of latency.

During the high performance to low power transition, phase 1 follows phase 2. The processor clock frequency is reduced first such that when the processor supply voltage level is reduced later on during phase 1, the reduced processor core voltage level is adequate to support it. Phase 2 is performed in the same manner as with regards to the low power to high performance transition, except that the core frequency level is reduced instead of elevated. Phase 1 is also performed in the same manner as with regards to the low power to high performance transition, except that the core voltage level is reduced instead of elevated.

Both of the above performance states transitions are achieved seamlessly, relatively rapidly and dynamically without user intervention. It is contemplated that although this description refers specifically to a processor, other components in which performance states may be adjusted can be substituted in its place. Examples of such components are an application-specific integrated circuit (ASIC), a programmable gate array (PGA), a graphics subsystem, memory subsystem, buses or other discrete integrated devices.

Figure 2:
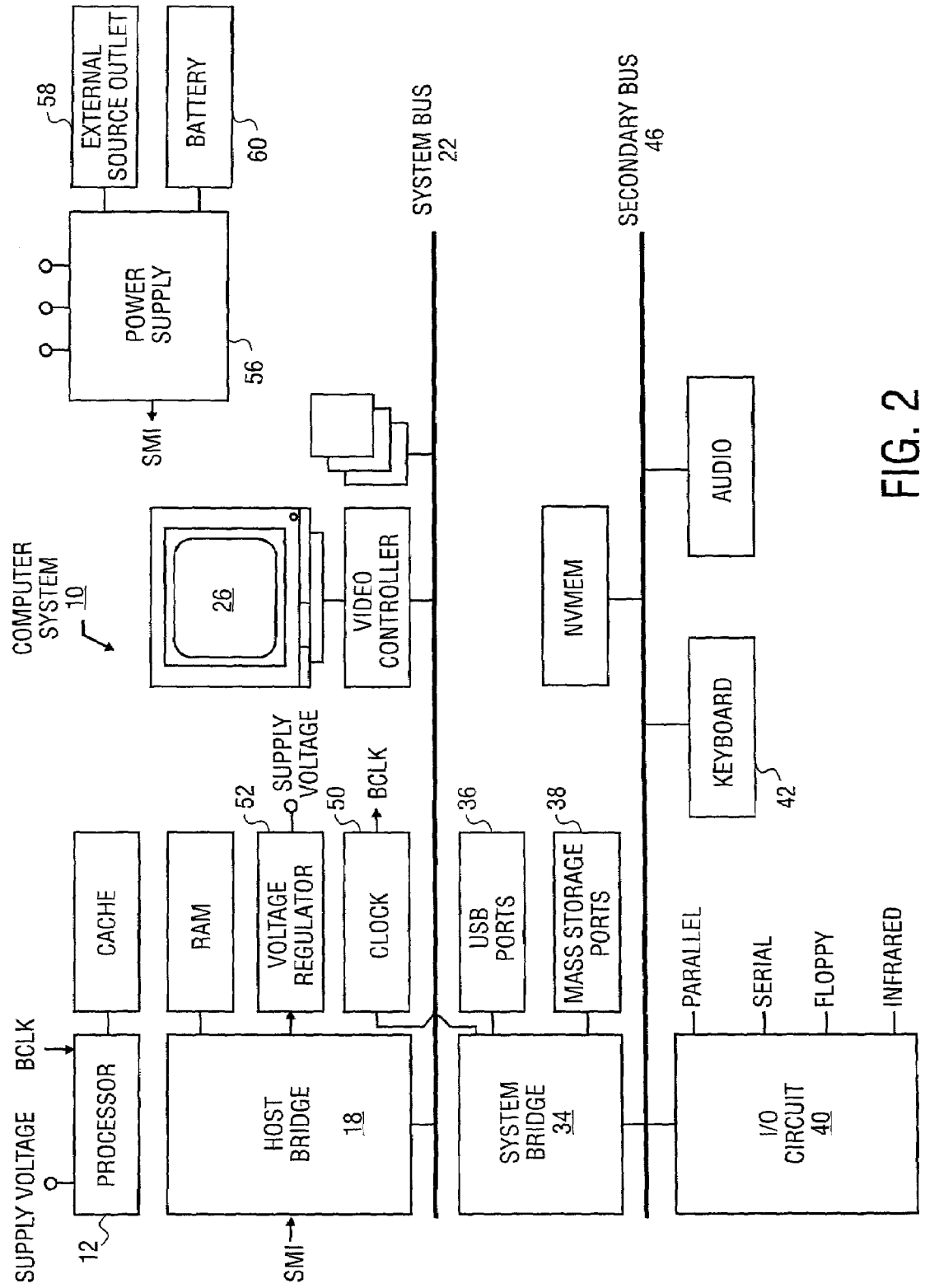
FIG. 2 is a block diagram of a system according to one embodiment.

Referring to FIG. 2, an example system 10 according to an embodiment of the invention includes a processor 12 that receives an external clock BCLK (from a clock generator 50) and a supply voltage (from a voltage regulator 52). The voltage regulator 52 and the clock generator 50 are both controllable to adjust the core supply voltage levels as well as the core clock frequencies in the processor 12, as further described below.

The main power supply voltages in the system 10 are provided by a power supply circuit 56 that is coupled to a battery 60 or an external power source outlet 58. When the external power source (not shown) is plugged into or removed from the external outlet source 58, an interrupt (e.g., a system management interrupt or SMI) may be generated to notify system software of the external power source insertion or removal. In addition, docking the system 10 to a docking base unit may also indicate a power source transition. In one embodiment, a device driver may detect power source transitions and docking events by registering with the operating system for power and plug-and-play notifications, for example. Thus, depending on whether the system 10 is powered by an internal power source (e.g., battery 60) or by an external power source (e.g., as coupled through the external source outlet 58), the system 10 may be set at a suitable performance state. For example, when the external power source is coupled, the system 10 may operate in the high performance state; however, if the internal power source is coupled instead, the system 10 may operate at the low power state.

Additionally, the computer system 10 may provide a graphical user interface through which a user may specify the desired performance state of the system.

The processor 12 may be coupled to a cache memory 14 as well as to a host bridge 18 that includes a memory controller for controlling system memory 16. The host bridge 18 is further coupled to a system bus 22, which may in one embodiment be a Peripheral Component Interconnect (PCI) bus, as defined in the PCI Local Bus Specification, Production Version, Rev. 2.1, published on Jun. 1, 1995. The system bus 22 may also be coupled to other components, including a video controller 24 coupled to a display 26 and peripheral slots 28.

A secondary or expansion bus 46 may be coupled by a system bridge 34 to the system bus 22. The system bridge 34 includes interface circuits to different ports, including a universal serial bus (USB) port 36 (as described in the Universal Serial Bus Specification, Revision 1.0, published in January 1996) and ports that may be coupled to mass storage devices such as a hard disk drive, compact disc (CD) or digital video disc (DVD) drives, and the like.

Other components that may be coupled to the secondary bus 46 include an input/output (I/O) circuit 40 coupled to a parallel port, serial port, floppy drive, and infrared port. A non-volatile memory 32 for storing basic input/output system (BIOS) routines may be located on the bus 46, as may a keyboard device 42 and an audio control device 44, as examples. It is to be understood, however, that all components in the system 10 are for illustrative purposes and the invention is not limited in scope to the illustrated system.

Various software or firmware layers (formed of modules or routines, for example), including applications, operating system modules, device drivers, BIOS modules, and interrupt handlers, may be stored in one or more storage media in the system. The storage media includes the hard disk drive, CD or DVD drive, floppy drive, non-volatile memory, and system memory. The modules, routines, or other layers stored in the storage media contain instructions that when executed causes the system 10 to perform programmed acts.

The software or firmware layers can be loaded into the system 10 in one of many different ways. For example, code segments stored on floppy disks, CD or DVD media, the hard disk, or transported through a network interface card, modem, or other interface mechanism may be loaded into the system 10 and executed as corresponding software or firmware layers. In the loading or transport process, data signals that are embodied as carrier waves (transmitted over telephone lines, network lines, wireless links, cables, and the like) may communicate the code segments to the system 10.

In the description that follows, reference is made to specific signals and circuitry as well as to sequences of events—it is to be understood that the invention is not limited in scope to the illustrated embodiments.

Figure 3:
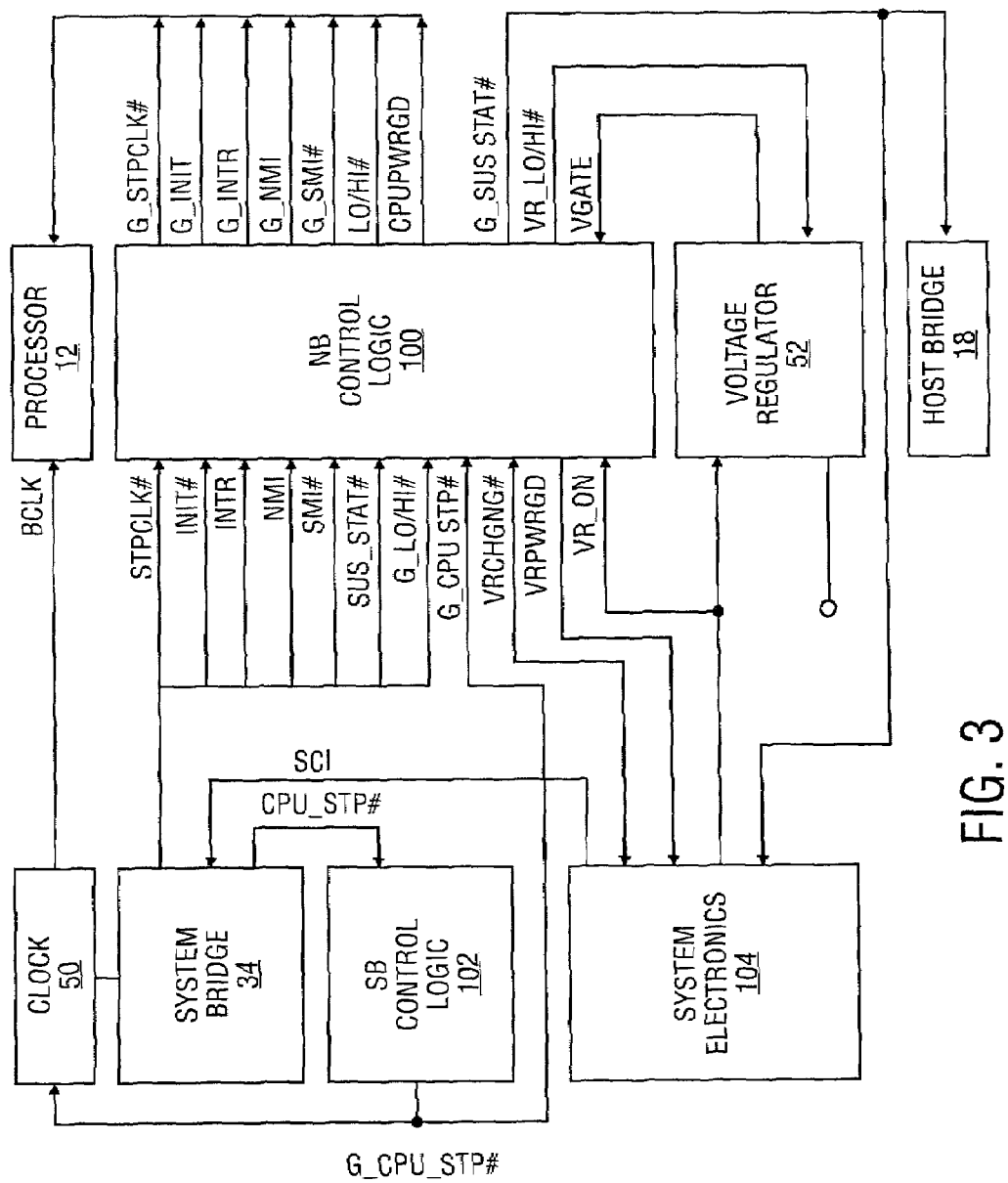
FIG. 3 is a block diagram of a power management control logic in the system of FIG. 2.

Referring to FIG. 3, power management control logic according to an embodiment of the invention to control the core clock frequency and the core supply voltage level is shown. In the illustrated embodiment, the control logic may be separated into a first portion 100 and a second portion 102. However, it is contemplated that the control logic may also be integrated in one component. The first control logic portion 100 may be included in the host bridge 18, and the second control logic portion 102 may be included in the system bridge 34. Alternatively the first and second control logic portions may be implemented as separate chips. In addition, instead of being configured with host and system bridges 18 and 34 as illustrated in FIG. 2, the circuitry may be implemented as a memory hub (including interfaces to the processor and system memory) and an input/output (I/O) hub (including interfaces to the system bus and secondary bus). In this other configuration, the control logic 100 and 102 may be implemented in the memory hub. With the memory and I/O hubs, messages rather than signals may be used to provide the same functionality as the control logic 100, 102. Alternatively, a serial link may be used for communication with the voltage regulator 52 and clock generator 50.

The power management control logic (100,102) provides control signals to the voltage regulator 52 to adjust its supply voltage level and to the processor 12 to adjust the core clock frequency. In addition, the power management control logic (100, 102) is responsible for placing the processor 12 into the sleep mode to complete phase 2 of the transition sequence.

In one embodiment, the processor 12 includes a clock generator, which is a phase locked loop (PLL) circuit. The PLL circuit frequency may be varied according to the algorithm by storing data in a register. In one embodiment, the data is the bus ratio. The bus ratio is the ratio between the frequencies of the PLL circuit clock and the system clock BCLK. In one embodiment, the frequency of the system clock can remain the same while the PLL circuit clock frequency is changed. In further embodiments, the bus ratios settings may be stored in programmable devices in the processor, including, for example, fuse banks or non-volatile memory.

A brief description of the interface signals between the power management control logic (100, 102) and the other components of the system follows. A signal VR_LO/HI# is provided by the control logic portion 100 to indicate to the voltage regulator 52 the required core supply voltage.

A signal LO/HI# provided by the control logic portion 100 to the processor 12 determines whether the core clock frequency is to be set to a high or low level. As an example, the core clock frequency may be either 350 MHZ or 450 MHZ depending on whether LO/HI# is active or not. It is noted that additional signals may be used to adjust the core clock frequency to more than two levels. Similarly, additional signals other than VR_LO/HI# may also be used to control the voltage supply levels provided by the voltage regulator 52. In the illustrated embodiment, a signal G_LO/HI# from the system bridge 34 indicates the desired system state and controls the states of LO/HI# and VR_LO/HI#. Additional signals may be used to define more than two system states.

According to one embodiment of the invention, when the voltage regulator on signal (VR_ON) is active (which is true whenever the system is on), the voltage regulator 52 settles to the output selected by VR_LO/HI# (a low level or a high level). By way of example, a low supply voltage level may be about 1.3 V while a high supply voltage level may be about 1.8 V.

Figure 4:
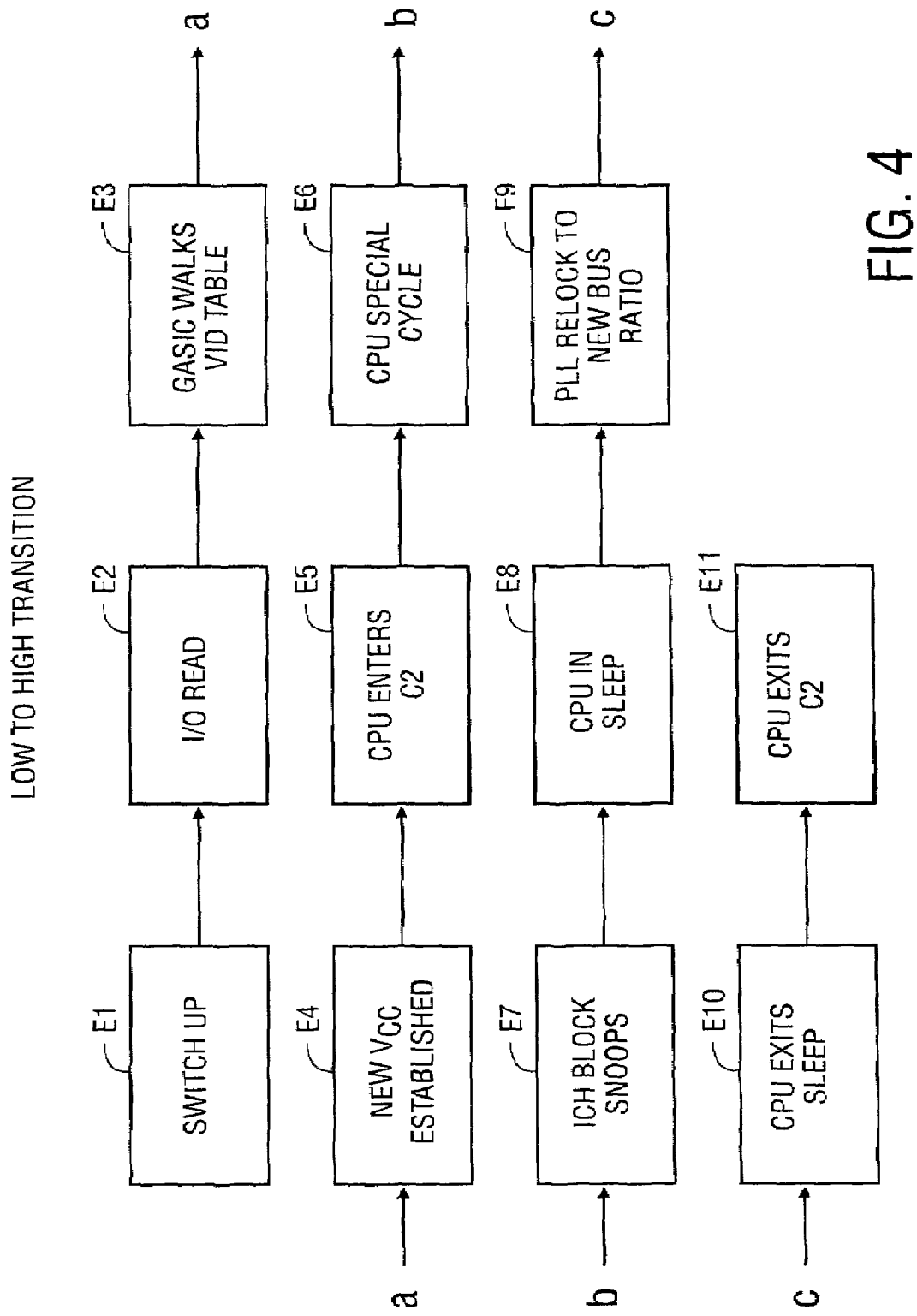
FIG. 4 is a flow diagram of a power management module according to one embodiment.

FIG. 4 illustrates a flow diagram of a power management module utilizing the power management control logic of FIG. 3 to perform low power to high performance dynamic performance state transition, in the system 10 of FIG. 2. The power management module may be implemented as a software module, in system firmware (e.g., system bios or SMI handler), as part of the operating system, as a device driver, or as a combination of the above. The power management module determines (at E1) to switch up the performance state level of the processor. This may be performed, for example, by writing a predefined value to a register to indicate the new performance state level of the processor 12. The controlled register may be defined in memory or I/O address space. In addition, programming of the register may be defined under the ACPI specification.

Thus, in one embodiment, one or more ACPI objects may be created to indicate to the operating system that the system 10 is capable of transitioning between the two performance states and to demand those resources when the system is ready to perform the transitions. The location and structure of the controlled register may be defined under an ACPI object. Furthermore, one or more ACPI objects may define the core clock frequencies and supply core voltage levels to be used in each performance state, the expected power consumption in each performance state, and other information.

Next, the power management module requests the input output control hub (ICH) to prepare for and assist in the performance state transition (at E2). Next, the control logic 100 indicates to the voltage regulator 52 that the voltage regulator 52 output should be at the high performance state core supply voltage level. In one embodiment, the voltage regulator 52 includes the Geyserville Application Specific Integrated Circuit (GASIC) to elevate the voltage regulator 52 output with a controlled ramping rate in a 25MV–50MV step wise fashion (at E3). GASIC elevates the voltage regulator 52 output in accordance with a VID voltage level table. The high performance state core supply voltage is established when the voltage regulator 52 output reaches the peak voltage level stated in the VID table (at E4). Next, the power management module places the processor 12 into the quick start mode (C2) (at E5). Next, the power management module informs the platform components that the processor can no more process their requests because it is about to enter into the sleep state (at E6). Next, the input output control hub (ICH) snoops to insure memory core coherency, for example, among the L1 cache, the L2 cache and the DRAM (at E7). Next, the power management module places the processor in the sleep state (at E8). Next, the power management adjusts the core clock frequency to the high performance level (at E9). In one embodiment, a phased locked loop (PLL) relocks to a new bus ratio. Next, the power management module removes the processor 12 from the sleep state (at E10). Finally, the power management module removes the processor from the quick start (C2) state (at E11).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

In addition, the methods as described above can be stored in memory of a computer system as a set of instructions to be executed. In addition, the instructions to perform the methods as described above could alternatively be stored on other forms of computer-readable mediums, including magnetic and optical disks. For example, the method of the present invention can be stored on computer-readable mediums, such as magnetic disks or optical disks that are accessible via a disk drive (or computer-readable medium drive).

What is claimed is:

1. A component comprising:
   a clock generator to switch from a first clock frequency to a second clock frequency while the component is in a sleep state, the switch from the first to the second clock frequency to be associated with a transition between a high performance state and a low power state; and
   a core to receive a voltage to switch from a first voltage level to a second voltage level while the component is in an active mode, the switch from the first voltage level to the second voltage level to be associated with the transition between the high performance state and the low power state.

2. The component of claim 1, wherein the component includes a cache, the contents of the cache to be maintained during the transition between the high performance state and the low power state.

3. The component of claim 1, wherein the component is a graphics controller.

4. The component of claim 1, wherein the component is a processor to execute instructions during the active mode.

5. The component of claim 4, wherein the active mode is a C0 mode.

6. A system comprising:
   a component to switch its clock frequency from a first clock frequency to a second clock frequency while the component is in a sleep state, the switch from the first to the second clock frequency to be associated with a transition between a high performance state and a low power state; and a voltage regulator to switch a core voltage to the component from a first voltage level to a second voltage level while the component is in an active mode, the switch from the first to the second voltage level to be associated with the transition between the high performance state and the low power state.

7. The system of claim 6, wherein the component includes a cache, the contents of the cache to be maintained during the transition between the high performance state and the low power state.

8. The system of claim 6, wherein the component is a graphics controller or a processor.

9. The system of claim 6, further comprising a voltage level table according to which the core voltage is to switch from the first voltage level to the second voltage level in a stepwise ramp.

10. The system of claim 9, wherein the voltage level table is to ramp the core voltage in 25 mV–50 mV steps.

11. A method comprising:
switching a clock generator of a component from a first clock frequency to a second clock frequency while the component is in a sleep state, the switch from the first to the second clock frequency associated with a transition between a high performance state and a low power state; and switching a core voltage from a first voltage level to a second voltage level while the component is in an active mode, the switch from the first voltage level to the second voltage level associated with the transition between the high performance state and the low power state.

12. The method of claim 11, further comprising maintaining contents of the cache during the transition between the high performance state and the low power state.

13. The method of claim 11, wherein the switching of the core voltage is done in accordance with a voltage level table.

14. A machine-readable medium including machine-readable instructions that, if execute by a computer system, cause the computer system to perform a method comprising:
switching a clock generator of a component from a first clock frequency to a second clock frequency while the component is in a sleep state, the switch from the first to the second clock frequency associated with a transition between a high performance state and a low power state; and switching a core voltage from a first voltage level to a second voltage level while the component is in an active mode, the switch from the first voltage level to the second voltage level associated with the transition between the high performance state and the low power state.

15. The machine-readable medium of claim 14, wherein the method further comprises maintaining contents of the cache during the transition between the high performance state and the low power state.

16. The machine-readable medium of claim 14, wherein the switching of the core voltage is done in accordance with a voltage level table.

17. A system comprising:
in a portable unit, a component to switch a clock frequency of the system from a first clock frequency to a second clock frequency while the component is in a sleep state, the switch from the first to the second clock frequency to be associated with a transition between a high performance state and a low power state; and a voltage regulator in the portable unit to switch a core voltage to the component from a first voltage level to a second voltage level while the component is in an active mode, the switch from the first to the second voltage level to be associated with the transition between the high performance state and the low power state.

18. The system of claim 17, wherein the component includes a cache, the contents of the cache to be maintained during the transition between the high performance state and the low power state.

* * * * *